United States Patent
Hagio

(10) Patent No.: US 9,216,784 B2
(45) Date of Patent: Dec. 22, 2015

(54) RUBBER CRAWLER TRACK

(75) Inventor: Daisuke Hagio, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1113 days.

(21) Appl. No.: 12/525,734

(22) PCT Filed: Feb. 5, 2008

(86) PCT No.: PCT/JP2008/051857
§ 371 (c)(1),
(2), (4) Date: Sep. 2, 2009

(87) PCT Pub. No.: WO2008/096749
PCT Pub. Date: Aug. 14, 2008

(65) Prior Publication Data
US 2010/0096915 A1   Apr. 22, 2010

(30) Foreign Application Priority Data
Feb. 5, 2007 (JP) ................. 2007-025678

(51) Int. Cl.
*B62D 55/00* (2006.01)
*B62D 55/24* (2006.01)

(52) U.S. Cl.
CPC .............. *B62D 55/244* (2013.01); *B62D 55/24* (2013.01)

(58) Field of Classification Search
CPC ........ B62D 55/00; B62D 55/18; B62D 55/24; B62D 55/244
USPC .................. 305/165, 166, 167, 170, 178, 179
See application file for complete search history.

(56) References Cited

U.S. PATENT DOCUMENTS

| 6,079,802 | A  | * | 6/2000 | Nishimura et al. | ............ | 305/157 |
| 6,722,746 | B2 | * | 4/2004 | Katayama et al. | ............ | 305/179 |
| 6,742,852 | B2 | * | 6/2004 | Tsuru et al. | ................... | 305/170 |
| 6,932,442 | B2 | * | 8/2005 | Hori | .............................. | 305/171 |
| 7,083,242 | B2 | * | 8/2006 | Piou et al. | ..................... | 305/167 |
| 7,578,565 | B2 | * | 8/2009 | Hirose et al. | .................. | 305/165 |

FOREIGN PATENT DOCUMENTS

| CN | 1424217 A  | 6/2003 |
| JP | 52-97740   | 7/1977 |
| JP | 52-119634  | 9/1977 |
| JP | 57-99476 A | 6/1982 |

(Continued)

OTHER PUBLICATIONS

Chinese Office Action issued in Chinese Application No. 200880004122.0 dated Jan. 30, 2011 (with translation) (10 pages).

*Primary Examiner* — Jason Bellinger
(74) *Attorney, Agent, or Firm* — Sughrue Mion, PLLC

(57) ABSTRACT

A crawler track where damage to drive lugs is reduced is provided. Grooves (26) in the circumferential direction of the crawler track (10) are arranged at the roots of the drive lugs (24). Thereby, tensile strain or compressive strain occurring in the roots of the drive lugs (24) when the crawler track (10) is wrapped over a wheel (14) etc. can be alleviated. Further, when the crawler track (10) meanders, a lateral load causes lateral pressure from the wheel (14) to a drive lug (24), producing tensile strain in the root of the drive lug (24). However, such tensile strain can be alleviated because the wheel (14) does not come into contact with the drive lugs (24) in the meandering movement.

5 Claims, 6 Drawing Sheets

(56) References Cited

FOREIGN PATENT DOCUMENTS

| | | |
|---|---|---|
| JP | 3-227783 A | 10/1991 |
| JP | 5-170148 A | 7/1993 |
| JP | 8-169211 A | 7/1996 |
| JP | 3745007 B2 | 2/2006 |

* cited by examiner

RUBBER CRAWLER TRACK

TECHNICAL FIELD

The present invention relates to an endless rubber crawler track for mounting to a construction vehicle or the like.

RELATED ART

Rubber crawler tracks already exist with drive lugs formed to the inner peripheral face of the rubber crawler track at a uniform pitch for engagement with a sprocket, with the rubber crawler track driven by sequentially engaging the drive lugs with the sprocket. An idler is provided at the opposite side to that of the sprocket, rotating coupled to the sprocket, and a wheel is rotatably provided between the idler and the sprocket, as shown in FIG. 8, with the lateral faces of passing drive lugs 100 guided by wheels 104, preventing the rubber crawler track 102 from coming off (see, e.g., Japanese Published Patent No. 3745007).

However, if the rubber crawler track 102 meanders when turning or driving, tensile strain occurs at the root of the drive lugs 100 due to lateral load (in the direction of the arrow) received by the drive lug 100 from the wheel 104, as shown in FIG. 9. Since the side where tensile strain occurs is in contact with the wheel 104, the roots of the drive lugs 100 are readily damaged, or, as shown in FIG. 10, if dirt 106 is trapped between the wheels 104 and the drive lugs 100, the roots of the drive lugs 100 receive even more damage.

Problem to be Solved by the Invention

The present invention provides a rubber crawler track in which damage to drive lugs is reduced.

Method of Solving the Problem

The present invention is a rubber crawler track including: an endless belt-shaped rubber resilient body configuring an endless track; plural protrusions provided protruding from the inner peripheral face of the rubber resilient body at uniform intervals along the circumferential direction thereof; and grooves located at the roots of the protrusions and formed in a wheel-passing face that a wheel follows in motion.

In an aspect of the present invention the plural protrusions are provided protruding from the inner peripheral face of the rubber resilient body at uniform intervals along the circumferential direction thereof. A sprocket engages these protrusions and drive force is transmitted thereto. The rubber crawler track is driven thereby. The protrusions are guided by wheels that follow the sprocket.

Grooves are formed in the wheel-passing face located at the roots of the protrusions. Tensile strain or compressive strain generated at the roots of the protrusions can thereby be alleviated when the rubber resilient body is entrained around the wheels etc. In addition, tensile strain or compressive strain generated at the roots of the protrusions by pressure in a lateral direction on the protrusions from the wheels caused by lateral stress, can thereby be alleviated even when the rubber crawler track is meandering, since the roots of the protrusions do not make contact with the wheels. In addition, even when dirt penetrates to the roots of the protrusions, since the grooves function as escape grooves for the dirt, damage to the roots of the protrusions can be prevented.

In the present invention the grooves may be provided continuously along the wheel-passing face.

Since the grooves are provided continuously along the wheel-passing face, the above aspect is more effective in comparison to when grooves are only formed at the protrusions.

In the present invention vent holes, for letting gas inside the mold escape during molding of the rubber resilient body, may be provided at locations that become the grooves. In the above aspect, a finishing process to valleys occurring on the product surface after molding becomes unnecessary due to the vent holes being provided at locations that become the grooves in the mold for molding the rubber resilient body, so the number of manufacturing processes can be reduced and a reduction in cost can be achieved.

In the present invention the grooves may be formed to be longer than the length along the circumferential direction of the rubber resilient body of the roots of the protrusions. The above aspect has improved dirt release due to the grooves being formed to be longer than the length of the roots of the protrusions.

In the present invention the width of the grooves may be greater than the depth of the grooves.

If the depth of the grooves is greater than the width of the grooves of the rubber crawler track, there is a tendency for the compressive strain and tensile strain acting at the bottom (groove bottom) of the grooves to become too high, leading to splits (cracks) readily developing in the groove bottom. Therefore in the above aspect the width of the grooves of the rubber crawler track is made greater than the depth of the grooves.

In the present invention the radius of curvature of the inside corner portions of the grooves in the width direction may be greater than the radius of curvature of the outside corner portions of the grooves in the width direction.

The location of maximum strain in the rubber crawler track due the action of tensile stress and compressive stress is at the inside corner portions of the grooves in the width direction, therefore in the above aspect, the radius of curvature (R) of the inside corner portions of the grooves in the width direction is made larger than the radius of curvature of the outside corner portions of the grooves in the width direction, a greater R can therefore be taken for the groove bottom and cracking etc. can be suppressed.

In the present invention the end portions in the width direction of the inner peripheral face of the rubber resilient body may be made to project out further than the center portion in the width direction.

In the above aspect, by making the end portions in the width direction of the inner peripheral face of the rubber resilient body (rubber crawler track) project out further than the center portion in the width direction, the end portions in the width direction of the rubber crawler track deform toward the outer peripheral face side of the rubber crawler track when the rubber crawler track is entrained and driven with the inner peripheral face at the center portion in the width direction of the rubber crawler track making contact with the outer peripheral face of the idler etc. Hence any dirt adhered to the outer peripheral face of the rubber crawler track, which would become problem if continuously adhered thereto, can be smoothly and reliably separated and dropped off from the outer peripheral face of the rubber crawler track.

It should be noted that each width of the two end portions in the width direction of the rubber crawler track is preferably in the range of 10% to 30% of the width of the rubber crawler track starting from the end of the rubber crawler track, and more preferably 15%±3%, and sufficient separation off of any adhered mud onto the rubber crawler track can be achieved.

In contrast thereto, if each width of the end portions of the rubber crawler track is less than 10%, starting from the ends of the rubber crawler in the width direction, the width of deformation of the rubber crawler track is small, and there is concern that sufficient separation off of any adhered mud cannot be achieved. However, if each width of the side portions of the rubber crawler track exceeds 30%, then the turned up portion (deformed portion) is widened, the width of the cord reinforcement layer becomes narrow, and there is concern that insufficient rigidity of the rubber crawler track occurs, and that the width of the side portions at both ends in the width direction of the rubber crawler track is too wide, generating ragged edges.

With respect to this, preferably the end portions in the width direction of the inner peripheral face of the rubber crawler track are made to project out further than the central portion in the width direction thereof, and the initial location of the ends in the width direction of the rubber crawler track are preferably positioned 5 to 10 mm from the end location of the cord reinforcement layer.

Namely, if the initial location of the end in the width direction of the rubber crawler track is less than 5 mm from the end location of the cord reinforcement layer, the rigidity in the width direction of the rubber crawler track changes extremely sharply at the end portions of the cord reinforcement layer, and this causes the problem that folding of the edges can readily occur due to external force from the road surface.

However, if the initial location of the end in the width direction of the rubber crawler track exceeds 10 mm from the end location of the cord reinforcement layer, the width in which the cord reinforcement layer can be embedded is reduced, in comparison to a case such as described above where each of the widths of the end portions in the width direction of the rubber crawler track is from 10% to 30% of the rubber crawler track width, thus reducing the strength and rigidity thereof, and leading to breaking or coming off from the wheels readily occurring.

In such cases, the amount of projection of the end portions of the rubber crawler track in the width direction is preferably within the range of 5 to 15 mm from the center portion in the width direction of the inner peripheral face of the rubber crawler track, and the thickness at the two end portions of the rubber crawler track in the width direction is preferably within the range of 10 to 30 mm.

Namely, if the protrusion amount is less than 5 mm, when the rubber crawler track is entrained around the idler etc., the deformation described above of the end portions in the width direction of the rubber crawler track cannot be increased as much as desired, and as a result there is a concern that smooth and sufficient separation and dropping off of any adhered mud or the like cannot be obtained. However, if the protruding amount exceeds 15 mm, the end portions in the width direction of the rubber crawler track readily make contact with portions of the wheels or the machine body due to external force from the road surface, and there is the problem of this leading to the generation of external damage.

In the rubber crawler track as described above, preferably the thickness at the two end portions in the width direction is within the range of 10 to 30 mm. If this thickness is less than 10 mm then external damage readily occurs when the a portion of the machine body catches thereon, and if the thickness exceeds 30 mm then there is a problem that this causes resistance when driving in wet ground or turning.

Effect of the Invention

The present invention is configured as described above, and therefore damage occurring to the drive lugs can be reduced.

BEST MODE OF IMPLEMENTING THE INVENTION

Figure 1:
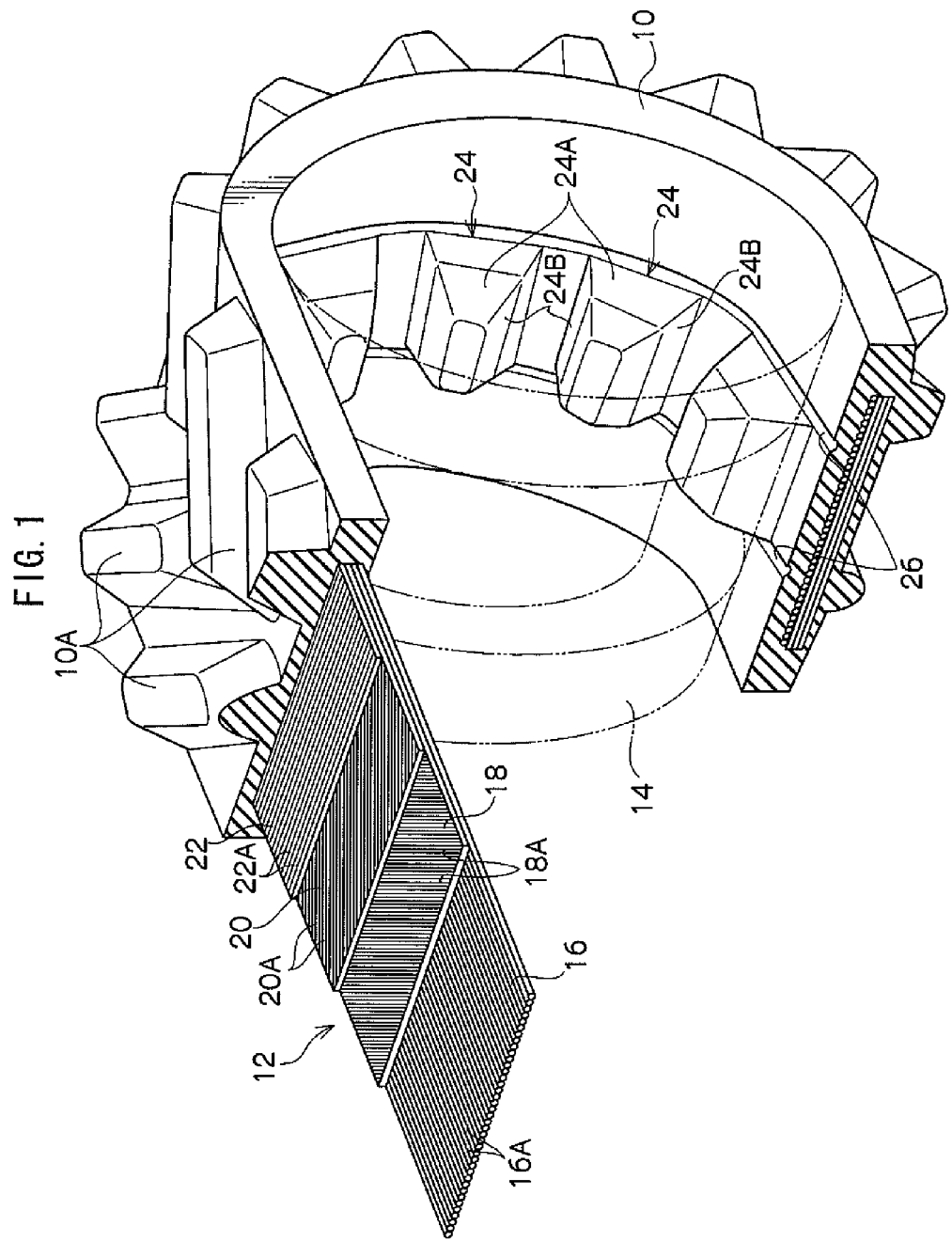
FIG. 1 is a perspective view including a partial cross-section of a rubber crawler track according to the present exemplary embodiment.

A crawler track 10 formed from a rubber resilient body, like the one shown in FIG. 1, is mounted to track drive device, configured by a sprocket and plural wheels, employed on bulldozers and the like. The crawler track 10 is of endless form and has reinforcement cords 12 embedded in the track in order to exhibit uniform strength characteristics in the track path.

The reinforcement cords 12 here are positioned at the inner peripheral face of the crawler track 10, and have a main cord layer 16 formed by plural cords 16A arrayed along the circumferential direction of the crawler track 10. A first bias cord layer 18 is provided above the main cord layer 16, the first bias cord layer 18 formed from plural cords 18A arrayed angled at a specific bias angle with respect to the circumferential direction of the crawler track 10.

A second bias cord layer 20 is provided above the first bias cord layer 18, the second bias cord layer 20 being formed from plural cords 20A arrayed angled in the opposite direction to that of the cords 18A, and in addition a sub cord layer 22 is provided above the second bias cord layer 20, the sub cord layer 22 formed from plural cords 22A arrayed along the width direction of the crawler track 10.

It should be noted that the reinforcement cords 12 are just an example thereof, and there is no limitation to such a configuration as long as uniform strength characteristics around the track path of the crawler track 10 are exhibited. For example, the arrayed directions of each of the cords may be changed, or the sequence of each of the layers changed. In addition, for example, configuration may also be made without the sub cord layer 22.

Lugs 10A of rectangular truncated pyramid shape are provided to the outer peripheral face of the crawler track 10 at a specific angle with respect to the width direction of the crawler track 10, extending out from the ends of the crawler track 10 in the width direction to a central portion thereof. The lugs 10A are disposed in the width direction of the crawler track 10 so as to alternate left and right, and are formed over the entire region of the outer peripheral face of the crawler track 10. The weight of the machine body is supported by the lugs 10A, and the lugs 10A provide propulsion force across the width direction of the crawler track 10.

Figure 2:
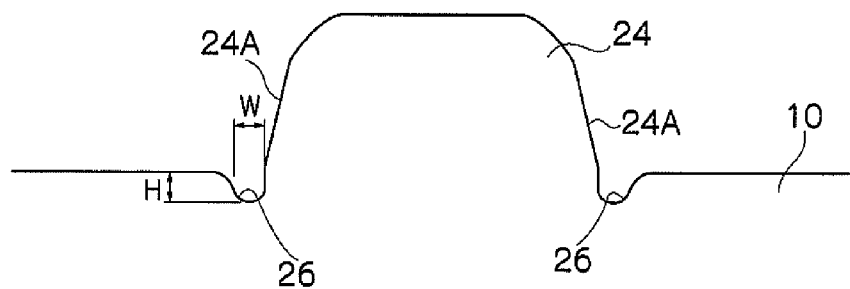
FIG. 2 is a cross-section of a rubber crawler track according to the present exemplary embodiment.

Plural drive lugs (protrusions) 24 of rectangular truncated pyramid shape are provided on the inner peripheral face of the crawler track 10, the drive lugs 24 being provided at even intervals along the circumferential direction of the crawler track 10. Grooves 26 are formed with a width (W) and a depth (H) of 10 mm, as shown in FIG. 2, at the feet of the drive lugs 24 around the whole of the perimeter in the circumferential direction of the crawler track 10.

Figure 3:
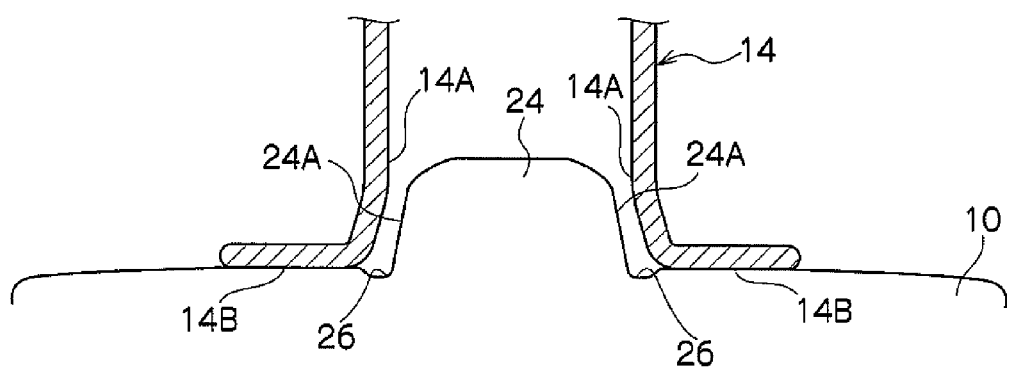
FIG. 3 is a cross-section showing wheels and drive lugs of a rubber crawler track according to the present exemplary embodiment.

A non-illustrated sprocket engages with the drive lugs 24, and the crawler track 10 is driven by transmitted driving force. As shown in FIG. 1 and FIG. 3, wheels 14 are provided at the inside of the crawler track 10, formed into a shape so as to straddle the drive lugs 24, the wheels 14 following the sprocket and guiding the passing drive lugs 24, such that the crawler track 10 does not come off.

A pair of substantially mutually opposing guide faces 14A are provided to the wheels 14, such that the guide faces 14A substantially oppose side faces 24A of the drive lugs 24 along the circumferential direction of the crawler track 10. Rolling faces 14B are provided substantially orthogonal to the guide faces 14A, such that the rolling faces 14B make contact with the inner peripheral face of the crawler track 10.

With respect to this, as shown in FIG. 3, the separation between the guide faces 14A of the wheels 14 is made just slightly wider than the separation between the side faces 24A of the drive lugs 24, such that when the crawler track 10 is driving in a straight line, the guide faces 14A of the wheels 14 do not make contact with the side faces 24A of the drive lugs 24, and there is no lateral stress acting on the drive lugs 24.

Figure 4:
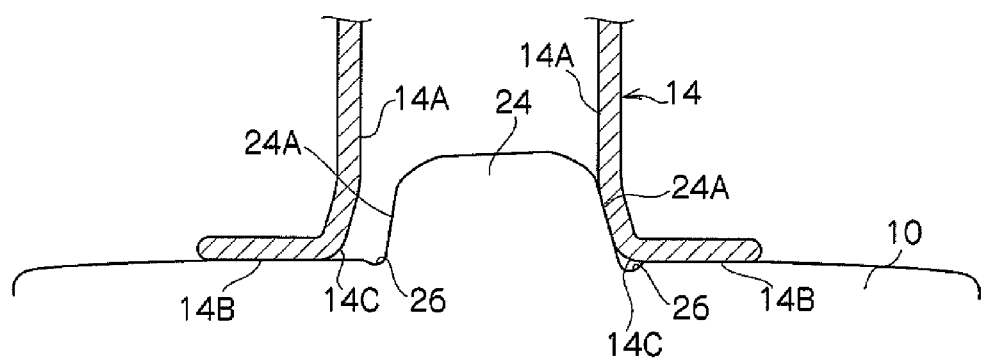
FIG. 4 is a cross-section showing a drive lug and wheels, shown in a meandered state of a rubber crawler track according to the present exemplary embodiment.

However, when the position of the drive lugs 24 displaces with respect to the wheels 14 due to the crawler track 10 meandering or the like, as shown in FIG. 4, the side faces 24A on one side of the drive lugs 24 make contact with the guide faces 14A of the wheels 14, but connection R portions 14C between the guide faces 14A and the rolling faces 14B do not make contact with the feet of the drive lugs 24 due to the grooves 26 formed at the roots of the drive lugs 24.

In other words, since the grooves 26 are formed at the roots of the drive lugs 24 along the circumferential direction of the crawler track 10, generation of tensile strain or compressive strain at the roots of the drive lugs 24 can be alleviated when the crawler track 10 is entrained on the wheels 14 etc.

In addition, even when the crawler track 10 is meandering, since the wheels 14 do not make contact with the roots of the drive lugs 24, generation of tensile strain at the root of the drive lugs 24, due to pressure in a lateral direction on the drive lugs 24 from the wheels 14 caused by lateral stress, can be alleviated.

Figure 5:
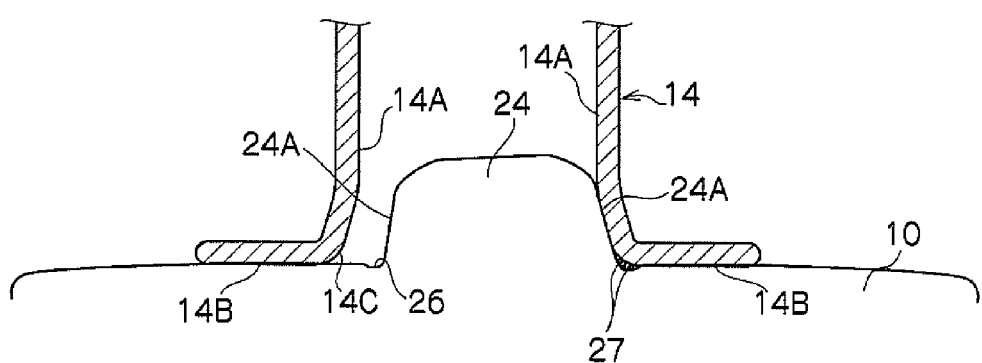
FIG. 5 is a cross-section showing a drive lug and wheels, shown in a meandered state of a rubber crawler track according to the present exemplary embodiment.

In addition, as shown in FIG. 5, even when dirt 27 penetrates to the roots of the drive lugs 24, since the grooves 26 function as escape grooves for the dirt 27, damage to the roots of the drive lugs 24 can be prevented.

While in the present exemplary embodiment the grooves 26 are provided along the circumferential direction of the crawler track 10 at a width and depth of 10 mm, there is no limitation to such a numerical value. It is sufficient as long as strain acting on the roots of the drive lugs 24 during driving of the crawler track 10 can be reduced, and as long as sufficient strength can be maintained in the drive lugs 24 to stop the crawler track 10 from coming off. In consideration of these points, 3 mm or greater and 30% or less of the thickness of the crawler track 10 (a depth such the reinforcement cords 12 are not reached) is preferable.

In the present exemplary embodiment the grooves 26 were provided around the entire periphery in the circumferential direction of the crawler track 10, however there is no limitation to this as long as strain acting on the roots of the drive lugs 24 can be alleviated, and the grooves 26 may be provided intermittently at each of the drive lugs 24. However, in consideration of dirt throw, the length of the grooves 26 is preferably longer than the side faces 24A of the drive lugs 24.

Also, the grooves 26 here have been formed along the circumferential direction of the crawler track 10 at the root of the side faces 24A of the drive lugs 24, however grooves (not shown in the drawings) may be further formed along the width direction of the crawler track 10 at the roots of side faces 24B of the drive lugs 24 (see FIG. 1).

Figure 6:
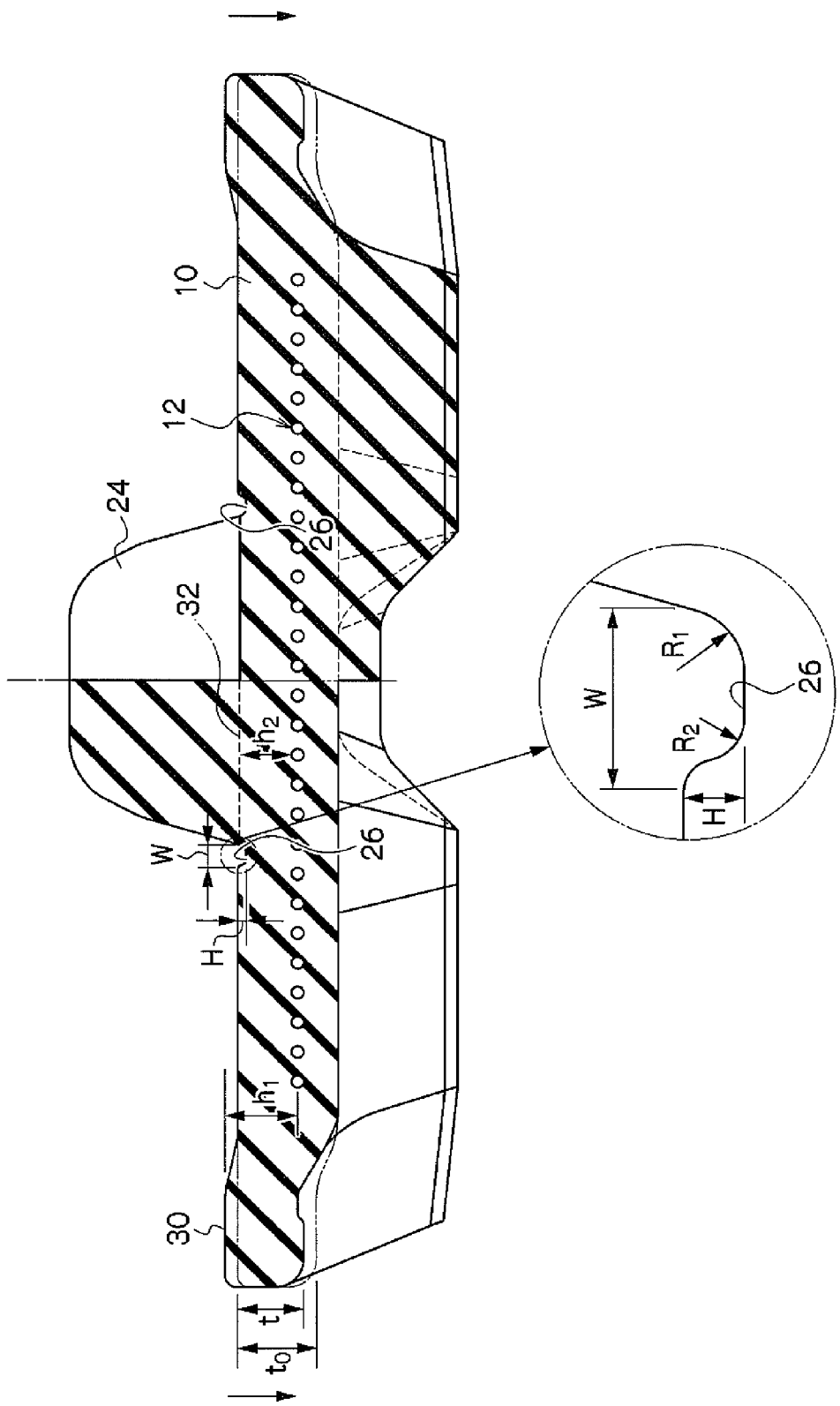
FIG. 6 is a cross-section showing another modified example of rubber crawler track according to the present exemplary embodiment.

Furthermore, in the present exemplary embodiment, as shown in FIG. 2, the width (W) and the depth (H) of the grooves 26 were 10 mm, however, as shown in FIG. 6, the width of the grooves 26 may be made greater than the depth of the grooves 26. This is because if the depth (H) of the grooves 26 of the crawler track 10 is made greater than the width (W) thereof, there is a tendency for the compressive strain and tensile strain acting at the bottom (groove bottom) of the grooves 26 to become too high, leading to splits (cracks) readily developing in the groove bottom.

In addition, the radius of curvature $R_1$ of the inside corner portions of the groove bottom of the grooves 26 in the width direction may be made greater than the radius of curvature $R_2$ of the outside corner portions of the groove bottom of the grooves 26 in the width direction. Since the location of maximum strain due to action of tensile strain and compressive strain on the crawler track 10 is at the inside corner portions of the groove bottom of the grooves 26 in the width direction, if $R_1$ of the inside corner portions of the groove bottom of the grooves 26 in the width direction is made large, a greater R (radius of curvature) can be taken for the groove bottom of the grooves 26, and cracking etc. can be suppressed.

In addition, the crawler track 10 may be made such that inner peripheral faces 30, which are provided at both end portions in the width direction of the crawler track 10 that do not include the reinforcement cords 12, and which occupy, for example, between 10% and 30%, or more preferably between 12% and 18%, of the total width of the crawler track 10, project around the whole periphery further to the inside, for example in the range of 5 to 15 mm further inside, than an inner peripheral face 32 at the center portion in the width direction of the crawler track 10, excluding the drive lugs 24.

According to this configuration, a rubber thickness h1 from the inner peripheral faces 30 at both end portions in the width direction of the crawler track 10 up to the reinforcement cords 12 is inevitably made thicker than a rubber thickness h2 from the inner peripheral face 32 at the center portion in the width direction of the crawler track 10 up to the reinforcement cords 12.

Consequently, when the inner peripheral face 32 at the center portion in the width direction of the crawler track 10 is entrained and driven around the outer peripheral face of a sprocket and idler (not shown in the drawings), the end portions of the crawler track 10 in the width direction must deform, and the inner peripheral faces 30 at the end portions in the width direction run at a portion further to the inside than the inner peripheral face 32 of the center portion in the width direction that is in contact with the outer peripheral face of the idler, and at a portion further to the inside than the outer peripheral face of the idler.

Since the inner peripheral faces 30 at the end portions in the width direction of the crawler track 10 project further than the inner peripheral face 32 at the center portion in the width direction, if the crawler track 10 is entrained on the idler etc. without any deformation in the cross-section thereof, the length in the circumferential direction of the inner peripheral faces 30 at the end portions in the width direction of the crawler track 10 is shorter than the length in the circumferential direction of the inner peripheral face 32 at the center portion in the width direction. Consequently the end portions of the crawler track 10 in the width direction, or at least the portions thereof entrained around the idler, try to attain the same circumferential direction length as that of the inner peripheral face 32 at the center portion in the width direction of the crawler track 10, and deform toward the outside so as to get out of the way of the outer peripheral face of the idler (shown by the double-dashed broken lines).

An initial separation distance t from the inner peripheral face 32 at the center portion in the width direction of the crawler track 10 up to the outer peripheral face at the end portions in the width direction is thereby increased to a separation distance t0, and accompanying such deformation of the inner peripheral faces 30 of the end portions in the width direction, mud that is adhered to the outer peripheral face of the crawler track 10 is reliably separated off due to the movement of the end portions in the width direction and dropped off without problems.

Figure 7:
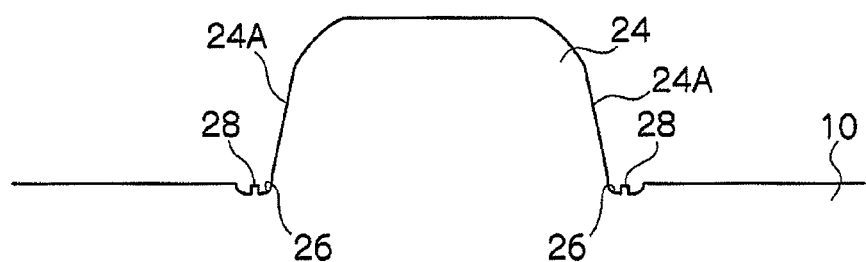
FIG. 7 is a cross-section showing a modified example of a rubber crawler track according to the present exemplary embodiment.
Figure 8:
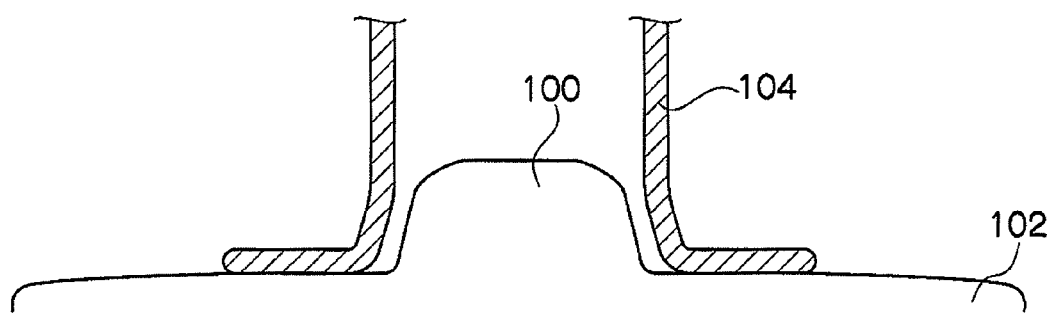
FIG. 8 is a cross-section showing a drive lug and wheel of a conventional rubber crawler track.
Figure 9:
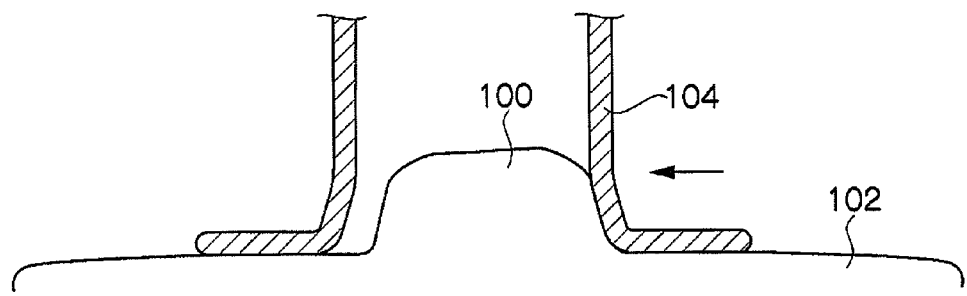
FIG. 9 is a cross-section showing a drive lug and wheel, shown in a meandered state of a conventional rubber crawler track.
Figure 10:
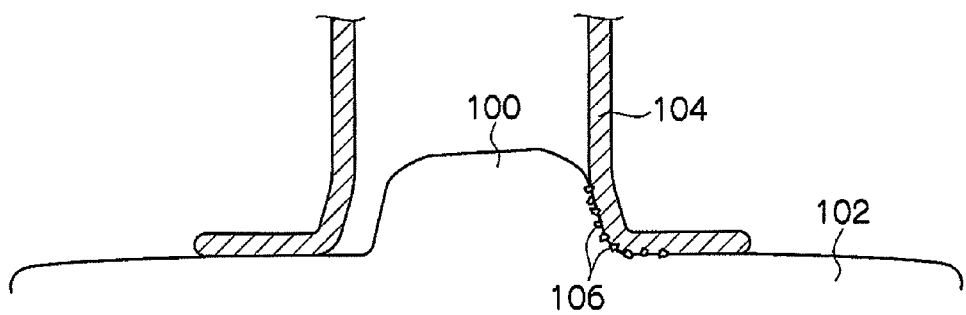
FIG. 10 is a cross-section showing a drive lug and wheel, shown in a meandered state of a conventional rubber crawler track.

So-called vent holes 28 (or strictly speaking trace of a vent hole) are formed in the mold (not shown in the drawings) for molding the crawler track 10, as shown in FIG. 7, in order to let gas generated within the cavity of the mold escape during molding, however configuration may be such that the vent holes 28 are present within the grooves 26 of the crawler track 10.

Portions provided with vent holes 28 generate valleys in the surface of the crawler track 10. Therefore, in order to remove such valleys it becomes necessary to carry out a finishing process, however, by providing the vent holes 28 in the grooves 26 such a finishing process becomes unnecessary, and by reducing the number of manufacturing processes a reduction in cost can be achieved.

With respect to this, the position of the vent holes 28 is preferably provided at the center in the width direction of the grooves 26, and the vent holes 28 are preferably made the depth of the grooves 26 in order that valleys occurring due to the vent holes 28 are not exposed from the surface of the crawler track 10. It should be noted that while vent holes 28 are provided here in the grooves 26, a vent ridge (not shown in the drawings) may be provided in the grooves 26.

The invention claimed is:

1. A rubber crawler track comprising:
   an endless belt-shaped rubber resilient body configuring an endless track;
   a plurality of protrusions provided protruding from the inner peripheral face of the rubber resilient body at uniform intervals along the circumferential direction thereof; and
   grooves located at the roots of the protrusions and formed in a wheel-passing face that a wheel follows in motion, and.
   during driving of the rubber crawler track, the protrusions being engaged with sprockets to transmit driving force, and the protrusions being formed of and protruding from the rubber resilient body,
   wherein the radius of curvature of the inside corner portions of the grooves in the width direction is greater than the radius of curvature of the outside corner portions of the grooves in the width direction,
   wherein the grooves are formed to be longer than the length of the roots of the protrusions along the circumferential direction of the rubber resilient body, and
   wherein the grooves are provided around the entire periphery, in the circumferential direction, of the rubber resilient body.

2. The rubber crawler track of claim 1, wherein the grooves are provided continuously along the wheel-passing face.

3. The rubber crawler track of claim 1, wherein vent holes for letting gas inside a mold escape during molding of the rubber resilient body are provided at locations within the grooves.

4. The rubber crawler track of claim 1, wherein the width of the grooves is greater than the depth of the grooves.

5. The rubber crawler track of claim 1 wherein the end portions in the width direction of the inner peripheral face of the rubber resilient body project further than the center portion in the width direction thereof.

* * * * *